United States Patent [19]
Atsuta et al.

[11] Patent Number: 5,194,992
[45] Date of Patent: Mar. 16, 1993

[54] LENS MOUNT ASSEMBLY

[75] Inventors: Toshikatsu Atsuta, Tokyo; Hidetoshi Yanagidaira, Nagano, both of Japan

[73] Assignee: Kyocera Corporation, Kyoto, Japan

[21] Appl. No.: 578,871

[22] Filed: Sep. 7, 1990

[30] Foreign Application Priority Data

Sep. 28, 1989 [JP] Japan .................................. 1-250487

[51] Int. Cl.⁵ .......................... G02B 7/02; G02B 15/14
[52] U.S. Cl. ..................................... 359/704; 359/811; 359/830
[58] Field of Search ............... 350/252, 255, 257, 427, 350/429, 430; 359/696–706, 819–830

[56] References Cited

U.S. PATENT DOCUMENTS

| 4,190,325 | 2/1980 | Moreno ................................ 359/820 |
| 4,448,496 | 5/1984 | Isobe et al. ......................... 359/705 |
| 4,605,286 | 8/1986 | Sumi .................................... 359/703 |
| 4,733,945 | 3/1988 | Bacich ................................. 350/252 |
| 4,911,542 | 3/1990 | Nishio et al. ...................... 359/701 |
| 4,993,815 | 2/1991 | Yamazaki et al. ................. 350/255 |

FOREIGN PATENT DOCUMENTS

| 33616 | 4/1981 | Japan ................................... 350/255 |
| 247320 | 10/1985 | Japan ................................... 350/255 |

Primary Examiner—Bruce Y. Arnold
Assistant Examiner—Thong Nguyen
Attorney, Agent, or Firm—Spensley Horn Jubas & Lubitz

[57] ABSTRACT

The invention relates to a lens mount assembly used for various kinds of optical apparatus such as photographic camera, motion picture handy camera and video camera, characterized in that the stationary sleeve which has usually been employed to support the cam sleeve and the movable sleeve is eliminated. To this end, the movable sleeve is formed with a plurality of keying grooves and there is provided a supporting framework comprising a plurality of keying levers adapted to be slidably engaged into the respective keying grooves. The cam sleeve is rotatably mounted around the movable sleeve so that the movable sleeve is operatively associated with the cam sleeve and guided by the keying levers to be moved in the direction of the optical axis.

17 Claims, 6 Drawing Sheets

LENS MOUNT ASSEMBLY

BACKGROUND OF THE INVENTION

Field of the Invention

The present invention relates to a zoom lens mount assembly for use in optical aparatus such as photographic camera, handy motion picture camera, video camera, copying machine or optical image enlarger.

Background Art

The zoom lens mount assembly of well known art for use in the optical apparatus such as the photographic camera or the video camera principally comprises the cam sleeve having the elongate cam tracks extending circumferentially therearound and the movable sleeve having the cam followers (i.e., the pins provided with the rollers) extending through said cam tracks and movably supported inside said cam sleeve so that the optical system carried by said movable sleeve can be magnification-varied as said movable sleeve is moved in parallel to the optical axis by rotationally driving said cam sleeve.

In practice, a plurality of said movable sleeves are provided inside the cam sleeve so that the respective movable sleeves are guided by the stationary sleeve and moved in operative association with the cam sleeve.

The zoom lens mount assembly of this type comprises, however, a multilayered cylindrical structure including a stationary sleeve as a basic member, in which the cam sleeve is rotatable around said stationary sleeve and a plurality of movable sleeves are movable in the direction of the optical axis relative to said stationary sleeve. Such multilayered structure inconveniently results in bulky and weighty lens mount assembly. This problem becomes more serious when the zoom lens mount assembly is incorporated with additional mechanisms such as the auto-zooming mechanism and the auto-focussing mechanism.

Recently a zoom lens mount assembly has been developed, but it is difficult for such lens mount assembly to assure the true circularity for the individual cylindrical components. Particularly, the stationary sleeve must be molded with high precision in order to meet the requirement for said true circularity because the stationary sleeve is the basic component of the lens mount assembly as has been mentioned above and this necessarily leads to an increased manufacturing cost.

SUMMARY OF THE INVENTION

Accordingly, it is an object of the invention to minimize structural dimension and weight by eliminating the stationary sleeve as has conventionally incorporated in the structure and thereby to provide a novel lens mount assembly for optical apparatus suitable for effective reduction of a manufacturing cost.

The object set forth above is achieved, in accordance with the invention, by a lens mount assembly for optical apparatus having a cylindrical frame carrying lenses adapted to be moved in the direction of the optical axis for zooming or focussing, said lens mount assembly comprising a plurality of keying grooves extending in parallel to the optical axis in the outer surface of said cylindrical frame and a plurality of keying levers adapted to be slidably engaged into these keying grooves, respectively, wherein said respective keying levers are interconnected together at respective one ends to form a supporting framework to be fastened to a lens mounting plate.

In the lens mount assembly of the above-mentioned arrangement, a plurality of keying levers serving to move the cylindrical frame carrying lenses in the direction of the optical axis are interconnected together to form a supporting framework for the lens mount assembly and thereby a demand for the conventional stationary sleeve is eliminated. Consequently, dimension, weight and manufacturing cost of the lens mount assembly are correspondingly reduced.

Since a plurality of the keying levers are interconnected together to form the supporting framework for the lens mount assembly, angular misalignments, if any, between the keying grooves of the cylindrical frame and the respective keying levers slidably engaged therein could be accommodated and, in addition, keying between the supporting framework and the cylindrical frame is effected at a plurality of locations.

By forming the supporting framework by interconnecting a plurality of the keying levers, a rigidity required to support the lens mount assembly is improved and a deflecting torque possibly occurring due to a play in engagement between the cam sleeve and the cylindrical frame is effectively distributed as a rotation of the came sleeve is converted into a linear movement of the cylindrical frame. In this manner, an eccentricity of the lens mount assembly is minimized and a high concentricity precision of the lens is guatanteed for the lens mount assembly.

Replacement of the conventional stationary frame by the supporting framework comprising a plurality of the keying levers which may be formed either from metallic material or from plastic material allows the lens mount assembly to be easily produced at a low cost.

BRIEF DESCRIPTION OF THE DRAWINGS

FIGS. 1 through 3 illustrate a first embodiment of the invention, in which:

FIGS. 5 through 7 illustrate a second embodiment of the invention, in which:

DESCRIPTION OF THE PREFERRED EMBODIMENTS

The invention will be described by way of example in reference with the accompanying drawings.

Figure 1:
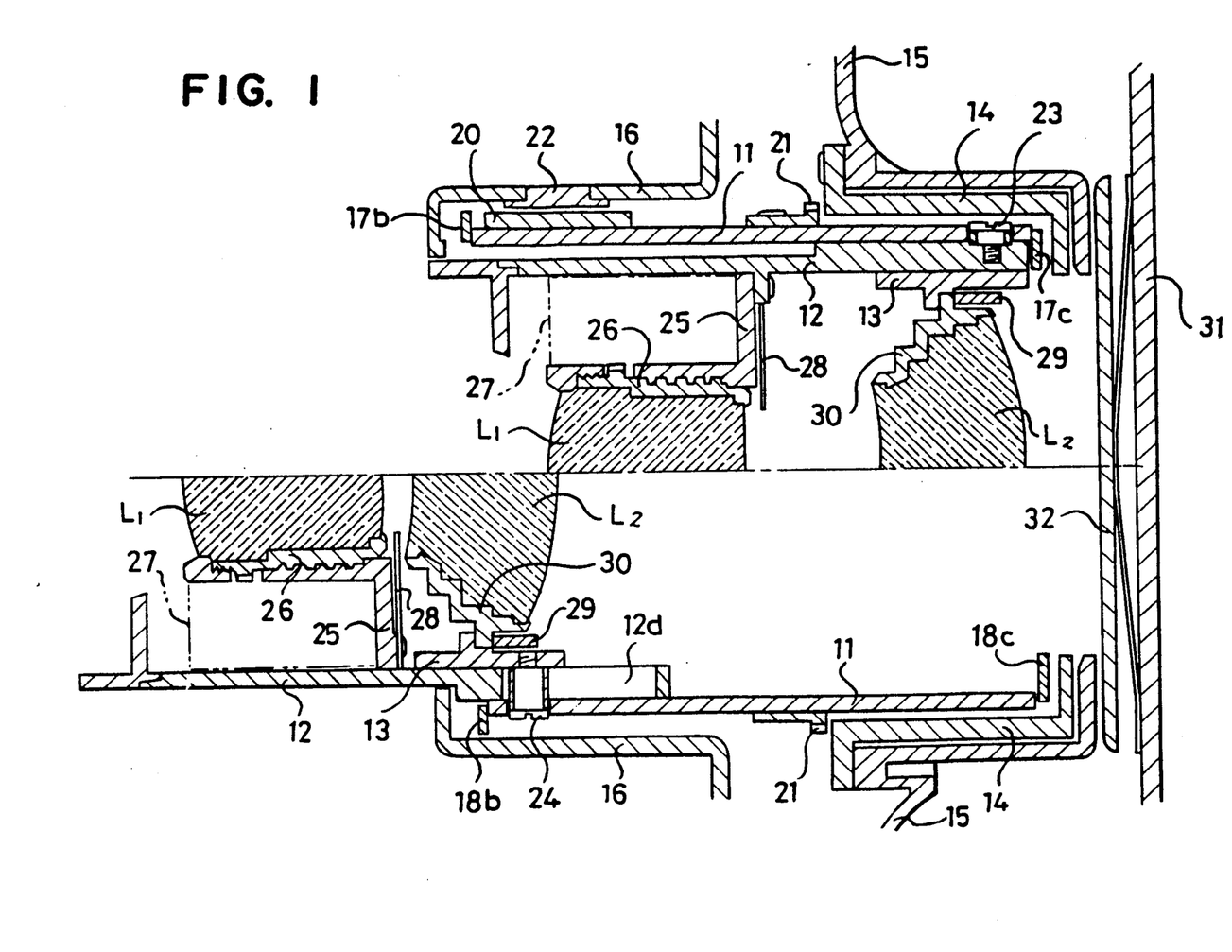
FIG. 1 is a sectional view of a zoom lens mount assembly constructed as the first embodiment.
Figure 2:
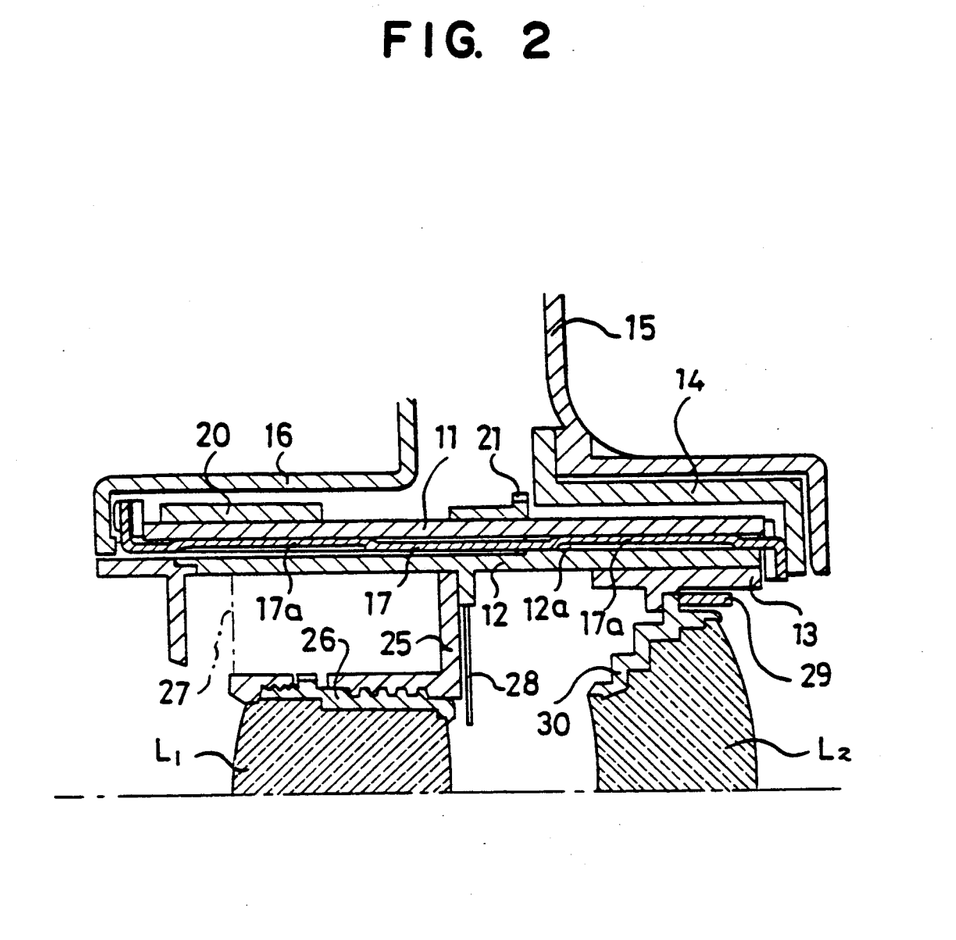
FIG. 2 is a fragmentary sectional view of the same zoom lens mount assembly as taken along another cutting plane.
Figure 3:
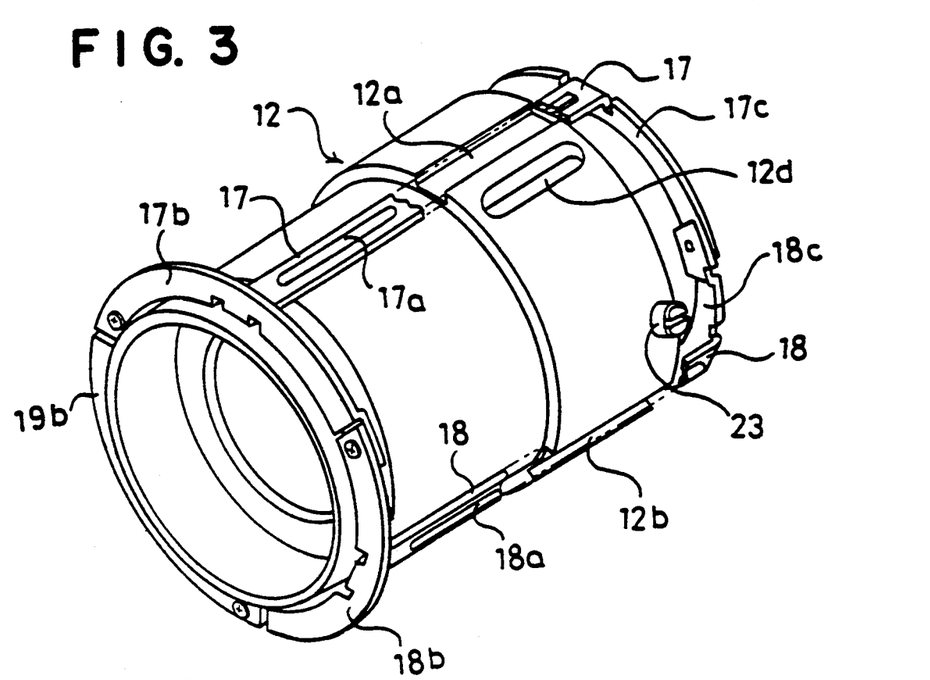
FIG. 3 is a perspective view of a first movable sleeve and a supporting framework comprising a plurality of keying levers.

FIG. 1 is a sectional view of a zoom lens mount assembly constructed as a first embodiment of the invention, showing a WIDE mode in an upper half and a TELE mode in a lower half of the figure, FIG. 2 is a fragmentary sectional view of the same zoom lens mount assembly as taken along another cutting plane and FIG. 3 is a perspective view illustrating a supporting framework and a movable sleeve in this zoom lens mount assembly.

Referring to FIGS. 1 through 3, reference numeral 11 designates a cam sleeve peripherally formed with cam slots, similarly, reference numeral 12 designates a first movable sleeve for movement inside the cam sleeve in the direction of the optical axis, reference numeral 13 designates a second movable sleeve for movement inside the first movable sleeve in the direction of the optical axis, reference numeral 14 designates a lens mounting plate used to mount the lens mount assembly on a camera body designated by reference numeral 15, reference numeral 16 designates a front cover, and reference numerals 17, 18, 19 designate keying levers forming together said supporting framework.

The cam sleeve 11 is peripherally formed with first and second cam slots in a well known manner and provided on its outer periphery with a ring-shaped scale plate 20 and a drive gear 21 screw-fastened thereto at predetermined positions, respectively, as illustrated. The scale plate 20 serves to indicate an angular position of the cam sleeve 11 and is adapted to be viewed through a scale display window 22 formed in the front cover 16. The drive gear 21 is operatively associated with a motor-driven unit (not shown) provided on the camera body 15 to rotate the cam sleeve 11 for the purpose of zooming.

Said cam sleeve 11 is rotatable around the first movable sleeve 12 as it is kept in contact with ridges 17a, 18a, 19a (19a is not shown) of the respective keying levers 17, 18, 19, but prevented by front flanges 17b, 18b, 19b and rear flanges 17c, 18c, 19c of the respective keying levers 17, 18, 19 from being moved in the direction of the optical axis.

As shown by a perspective view in FIG. 3, a rear half of the first movable sleeve 12 comprises a diameter-enlarged section having a thicker wall. The diameter-enlarged section is provided on its outer surface with a cam follower 23 adapted to be operatively associated with the first cam slot of the cam sleeve 11 and has an elongate guide slit 12d linearly extending in parallel to the optical axis in which a cam follower 24 of the second movable sleeve 13 is slidably engaged so as to be operatively associated with the second cam slot of the cam sleeve 11.

Said diameter-enlarged section is further formed therearound with keying grooves 12a, 12b, 12c (12c is not shown) extending axially and equidistantly spaced from one another circumferentially of the sleeve, and these keying grooves are adapted to receive the respective keying levers 17, 18, 19. The first movable sleeve 12 contains therein a shutter frame 25 screw-fastened thereto and a holder frame 26 for a front lens group L₁ is connected to said shutter frame 25 by helicoidal threads formed on these frames 25, 26, respectively.

There is provided, at a location as indicated by two-dotted-chain line, a motor-driven unit adapted to drive a shutter 28 and to rotate the holder frame 26 for the purpose of focussing.

The second movable sleeve 13 is movable inside the first movable sleeve 12 in the direction of the optical axis and includes, in addition to the previously mentioned cam follower 24, a holder frame 30 for a rear lens group L₂ secured therein by a nut 29.

As illustrated in detail by FIG. 3, the keying levers 17, 18, 19 comprise elongate plates adapted to be slidably engaged into the keying grooves 12a, 12b, 12c of the first movable sleeve 12, respectively, and longitudinally formed on their top surfaces with the ridges 17a, 18a, 19a, respectively. The keying levers 17, 18, 19 further include integrally therewith, arc-shaped flanges 17b, 18b, 19b radially outwardly extending from respective front ends and arc-shaped flanges 17c, 18c, 19c radially inwardly extending from respective rear ends.

Said keying levers 17, 18, 19 are slidably engaged into the associated keying grooves 12a, 12b, 12c of the first movable sleeve 12, then the cam sleeve 11 is placed around the first movable sleeve 12 and thereafter the front end flanges 17b, 18b, 19b are connected end to end by means of screws while the rear end flanges 17c, 18c, 19c are similarly connected end to end by means of screws to form the supporting framework.

The supporting framework thus formed rotatably supports the cam sleeve 11 between the front flange assembly and the rear flange assembly, on one hand, and supports the first movable sleeve 12 displaceably in the direction of the optical axis but against a rotation, on the other hand.

In actual operation of assembling, after the cam sleeve 11 is assembled around the first movable sleeve 12 with a diameter of the annulus defined by the flanges 17c, 18c, 19c being reduced, said diameter of the annulus defined by the flanges 17c, 18c, 19c is now slightly enlarged prior to the interconnection of these flanges. As a consequence, the cam sleeve 11 is rotatably supported between the front flange assembly and the rear flange assembly. The rear flange assembly of the supporting framework is screw-fastened to the lens mounting plate 14 which is, in turn, screw-fastened at its front flange to the camera body and thereby mounts the lens mount assembly on the camera.

Referring to FIG. 1, reference numeral 31 designates a rear cover and reference numeral 32 designates a pressure plate.

With this embodiment of the zoom lens mount assembly as has been described above, a drive force applied from the motor-driven unit for zooming to the drive gear 21 rotates the cam sleeve 11 as the latter is kept in contact with the ridges 17a, 18a, 19a of the respective keying levers 17, 18, 19 and the respective cam followers 23, 24 bearing against the cam surfaces of the respective cam slots also are driven in operative association therewith. As a result, the keying grooves 12a, 12b, 12c are slidably moved along the respective keying levers 17, 18, 19 and thus the first movable sleeve 12 is moved in the direction of the optical axis as it is held against a rotation. The second movable sleeve 13 also is moved in the direction of the optical axis as it is held against a rotation, since the cam follower 24 is linearly moved along the guide slit 12d of the first movable sleeve 12.

In this manner, a desired zooming is achieved by displacements of the front lens group L₁ and the rear lens group L₂.

The linear displacements of the first movable sleeve 12 and the second movable sleeve 13 are controlled by the first cam slot and the second cam slot, respectively, of the cam sleeve 11 and the angular displacement of the cam sleeve 11 is controlled by a signal processor contained within the camera body 15.

In the zoom lens mount assembly according to this embodiment, the holder frame 26 is rotationally driven by the motor-driven unit and thereby the front lens group $L_1$ is displaced for the purpose of focussing.

It should be understood that, in this specific zoom lens mount assembly, the holder frame 26 is rotationally adjustable along the helicoidal threads, and a washer is interposed between the lens mounting plate 14 and the rear end flange assembly defined by the rear end flanges 17c, 18c, 19c of the respective keying levers 17, 18, 19 for so called shift and back fine adjustments.

Figure 4:
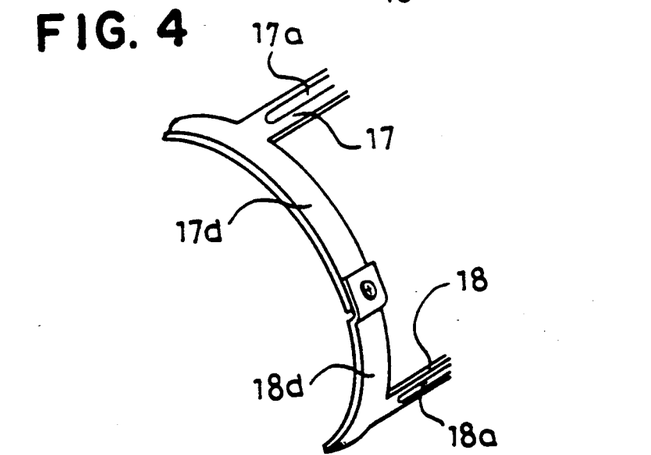
FIG. 4 is a fragmentary perspective view showing a variant of the keying levers.

As seen in FIG. 4, said keying levers 17, 18, 19 may be provided with arc-shaped plates 17d, 18d, 19d (19d is not shown) replacing said front flanges 17b, 18b, 19b, respectively.

Figure 5:
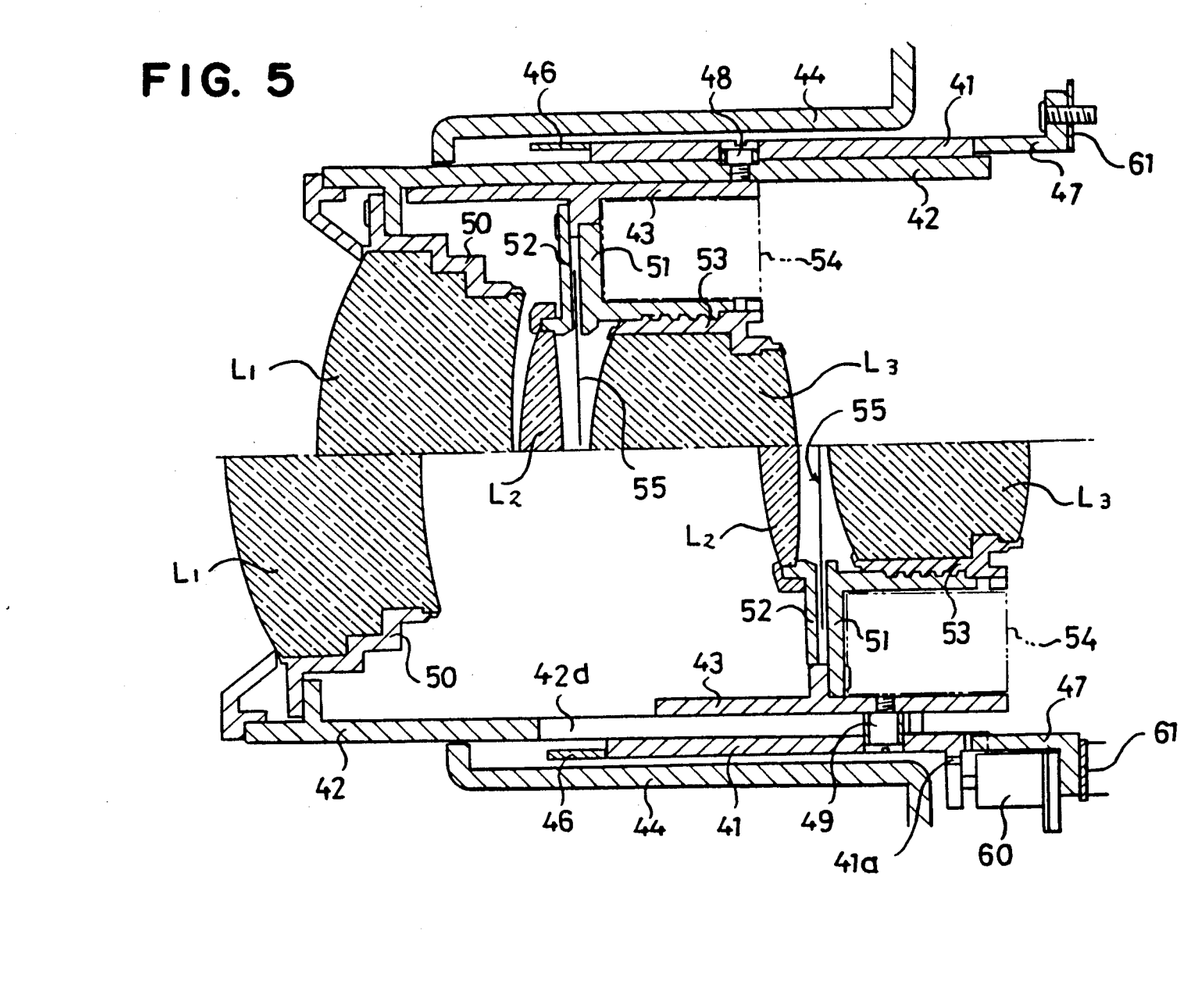
FIG. 5 is a sectional view of a zoom lens mount assembly constructed as the second embodiment.
Figure 6:
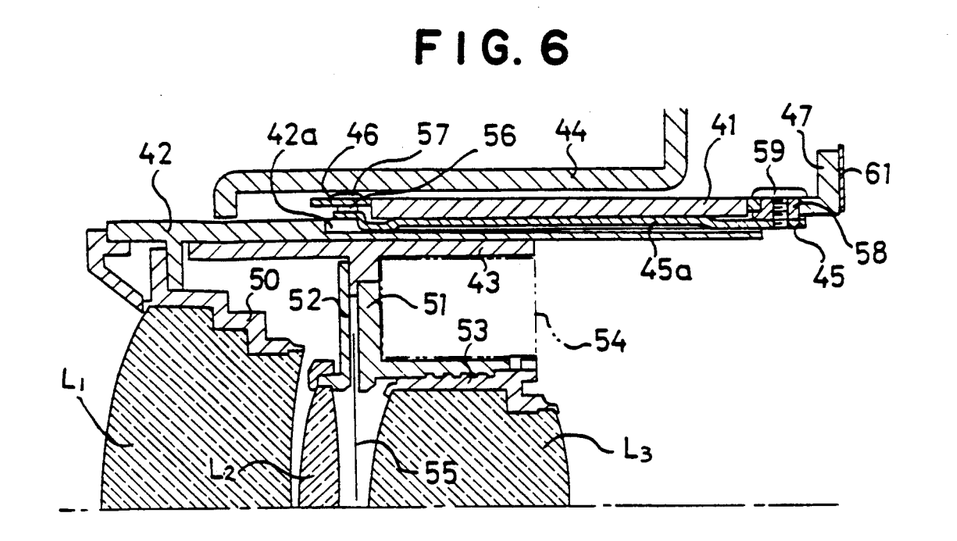
FIG. 6 is a fragmentary sectional view of the same zoom lens mount assembly as taken along another cutting plane.
Figure 7:
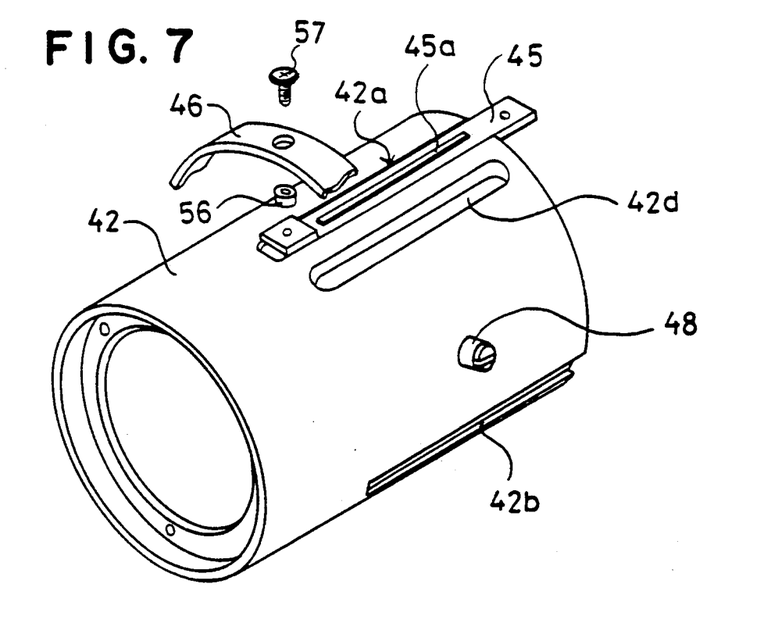
FIG. 7 is a perspective view of a first movable sleeve and a supporting framework comprising a plurality of keying levers.

FIGS. 5 through 7 illustrate a second embodiment of the invention, in which FIG. 5 is a sectional view of a zoom lens mount assembly constructed as the second embodiment, showing a WIDE mode in an upper half and a TELE mode in a lower half, FIG. 6 is a fragmentary sectional view of the same zoom lens mount assembly as taken along another cutting plane and FIG. 7 is a perspective view, partially broken away, of a first movable sleeve and keying levers.

Referring to FIGS. 5 through 7, reference numeral 41 designates a cam sleeve peripherally formed with cam slots, similarly, reference numeral 42 designates a first movable sleeve for movement inside the cam sleeve in the direction of the optical axis, reference numeral 43 designates a second movable sleeve for movement inside the first movable sleeve in the direction of the optical axis, reference numeral 44 designates a front cover, and reference numeral 45 designates keying levers.

The cam sleeve 41 is a cylindrical piece peripherally formed with first and second cam slots in a well known manner and being rotatable around the first movable sleeve 42 between a ring-shaped plate 46 which cooperates with the keying levers 45 to form a supporting framework and a ring-shaped lens mounting member 47 replacing the lens mounting plate in the first embodiment, but held against a linear movement in the direction of the optical axis.

The cam sleeve 41 is provided with a drive gear 41a which is, in turn, diriven by a motor 60. The cam sleeve 41 is cut away at its rear end surface to form an arc-shaped slot into which the ring-shaped lens mounting member 47 is partially engaged to limit a rotatable range of the cam sleeve 41.

As illustrated in detail by FIG. 7, the first movable sleeve 42 is provided on its outer surface with a cam follower 48 adapted to be operatively associated with a first cam slot of the cam sleeve 41 and is formed through its peripheral wall with an elongate guide slit 42d linearly extending in parallel to the optical axis, into which a cam follower 49 of the second movable sleeve 43 is slidably engaged so as to be operatively associated with a second cam slot of the cam sleeve 41. The first movable sleeve 42 is further formed therearound with keying grooves 42a, 42b, 42c (42c is not shown) extending axially and equidistantly spaced from one another circumferentially of the sleeve, and these keying grooves are adapted to receive the respective keying levers 45 in a slidable manner. The first movable sleeve 42 contains therein adjacent its front end a holder frame 50 screw-fastened thereto to hold a front lens group $L_1$.

The second movable sleeve 43 includes, in addition to the previously mentioned cam follower 49, a shutter frame 51 and a holder frame 52 for an intermediate lens group $L_2$, both screw-fastened therein.

A folder frame 53 for a rear lens group $L_3$ is operatively associated with the shutter frame 51 by helicoidal threads formed in these frames 51, 53 and rotationally driven by the motor-driven unit 54 mounted at a location as indicated by a two-dotted-chain line in FIG. 5 so that the holder frame 53 is rotationally driven and thereby a desired focussing is achieved. Such arrangement is generally referred to as the rear focus structure as well known to those skilled in the art. It should be understood that the shutter 55 is driven by said motor-driven unit mounted at the location as indicated by the two-dotted-chain line 54.

Referring to FIGS. 6 and 7, each of the keying levers 45 comprises an elongate plate adapted to be slidably engaged into the associated keying groove formed in the outer peripheral surface of the first movable sleeve 42 and this keying lever is formed on its top surface with a ridge 45a.

There are provided three such keying levers 45 which are adapted to be slidably received by the respective three keying grooves 42a, 42b, 42c formed in the first movable sleeve 42 and interconnected together by the ring-shaped plate 46 secured to the respective keying levers at rising portions thereof adjacent their front ends to form a supporting framework.

The ring-shaped plate 46 is secured by screws 57 to the respective keying levers 45 with interposition of collars 56 between the ring-shaped plate 46 and the respective keying levers 45. After the cam sleeve 41 has been mounted around the first movable sleeve 42, the keying levers 45 are fastened at their rear ends to the ring-shaped lens mounting member 47 by collars 58 and screws 59.

In the zoom lens mount assembly constructed as the second embodiment, the motor 60 drives the drive gear 41a which, in turn, rotationally drives the cam sleeve 41, causing the cam slots to drive the associated cam followers 48, 49. During rotation, the cam sleeve 41 is kept in contact with the ridges 45a of the respective keying levers 45.

The keying grooves 42a, 42b, 42c are slidably moved along the respective keying levers 45 as the cam followers 48 is driven by the associated cam slot and, in consequence, the first movable sleeve 42 is moved not angularly but only linearly in the direction of the optical axis so as to displace the front lens group $L_1$. Since the cam follower 49 is also driven by the associated cam slot along the guide slit 42d of the first movable sleeve 42, the second movable sleeve 43 is moved not angularly but only linearly in the direction of the optical axis, displacing the intermediate lens group $L_2$ integrally with the rear lens group $L_3$.

The second embodiment is similar to the first embodiment except the specific manner of zooming as has been described immediately above.

In this embodiment, a washer 61 is interposed between the ring-shaped lens mounting member 47 and the camera body for the purpose of so-called back adjustment while a washer is interposed between the holder frame 50 and the inner flange of the first movable sleeve 42 or said holder frame 50 is adapted to be adjustably displaced in the direction of the optical axis by a screwing movement thereof for the purpose of so-called shift adjustment.

Figure 8:
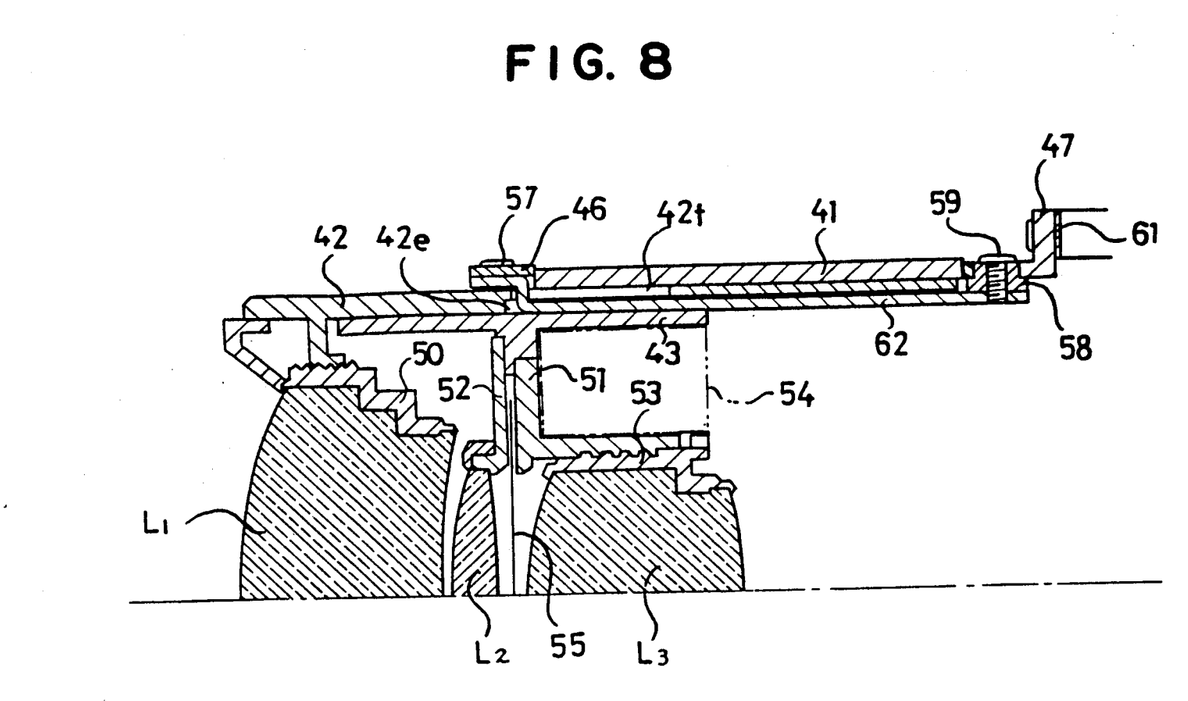
FIG. 8 is a fragmentary sectional view of a zoom lens mount assembly constructed as a third embodiment of the invention.

FIG. 8 is a view similar to FIG. 6, showing a third embodiment of the invention.

In this embodiment, the first movable sleeve 42 is formed in its inner surface with three keying grooves 42e extending axially and equidistantly spaced from one another circumferentially of this sleeve to receive respective keying levers 62 in a slidable manner. Each of the keying levers 62 has a rising portion adjacent its front end which extends vertically through an elongate slit 42f formed through the wall of the first movable sleeve 42 and then extends forward. This rising portion is screw-fastened to the ring-shaped plate 46.

Said three keying levers 62 are interconnected by the ring-shaped plate 46 to form a supporting framework which is screw-fastened to the ring-shaped lens mounting member 47. As for the remaining features, this embodiment is similar to the second embodiment.

While the invention has been described in connection with the respective specific embodiments, many variations and modifications will be apparent to those skilled in the art without departing from the spirit and scope of the invention. For example, by slightly enlarging a width of each keying lever along portions thereof extending before and behind a range of the slidable contact with the associated keying groove of the first movable sleeve, or by shaping a portion of the keying lever slidably contacted with the associated keying groove in arc-shape and thereby minimizing the area of slidable contact, or by forming the front flange of each keying lever with an elongate hole rather than the circular hole which receives a screw to interconnect the individual keying levers and thereby to form the supporting framework, it will be possible to accommodate an angular crossing error of some degree and to avoid an increased rotational torque of the cam sleeve.

While it is not essential to provide each of the keying levers with the ridge, it is preferred, in the case where the cam sleeve 11 and the first movable sleeve 12 overlap each other over a relatively small length as in the first embodiment, to arrange so that the inner surface of the cam sleeve 11 is contacted with the ridges 17a, 18a, 19a.

The keying lever provided with both the front flange and the rear flange will be useful exclusively for the particular model of lens mount assembly. To be useful universally for various models of lens mount assembly, the keying levers may be designed as shown in FIG. 7.

A plurality of the keying levers may be made either from metallic material or plastic material and the manner of interconnecting these keying levers is not limited to that used in the previously described embodiments but other well known manner of interconnection such as mating, bonding or the like may be also adopted.

The present invention is applicable to the zoom lens mount assembly for photographic apparatus such as photographic camera, motion picture handy camera, video camera, photographic copying machine or optical image expander. The invention can be implemented also as the lens mount assembly for the single focus lens.

It should be understood that the collar 56 may be replaced by a washer or the like.

What is claimed is:

1. A lens mount assembly for an optical apparatus including an optical system having an optical axis, said assembly comprising:
   cylindrical frame means for carrying said optical system for the purpose of zooming and focussing operations;
   said cylindrical frame means defining a plurality of keying grooves extending in parallel with the optical axis; and
   a plurality of keying levers adapted to slidably engage with said keying grooves wherein said keying levers are interconnected together at both ends thereof to form a supporting framework.

2. A lens mount assembly as recited in claim (1), wherein each of said keying levers comprises an elongate plate-like member adapted to slidably engage with each of said respective keying grooves.

3. A lens mount assembly as recited in claim (1), wherein said cylindrical frame means includes a plurality of keying grooves provided on an outer surface of said cylindrical frame means and extending in parallel with the optical axis and wherein said keying levers comprise a plurality of elongate plate-like members adapted to slidably engage with said respective keying grooves.

4. A lens mount assembly as recited in claim (1), wherein said keying levers comprise elongate plate-like members having longitudinal ridges provided on top surfaces thereof.

5. A lens mount assembly as recited in claim (1), wherein said plurality of keying levers includes ring-shaped members for connecting said keying levers at opposite ends thereof, respectively, to form said supporting framework.

6. A lens mount assembly as recited in claim (1), wherein each of the keying levers includes arc-shaped flanges at opposite ends thereof wherein after said keying levers have been engaged with said respective keying grooves of said cylindrical frame means, said respective keying levers are interconnected together at their flanges to form the supporting framework.

7. A lens mount assembly as recited in claim (1), wherein said cylindrical frame means includes a cam sleeve rotatably mounted about the optical axis and a cam follower, said cam sleeve including a cam slot for camming engagement with said cam follower, wherein said cylindrical frame means is supported by said keying levers for movement in the direction of the optical axis in operative association with rotation of said cam sleeve.

8. A lens mount assembly as recited in claim (1), wherein said cylindrical frame means includes a first cam follower and an elongate guide slit, and further including:
   a cam sleeve rotatably mounted around said cylindrical frame, said cam sleeve having first and second cam slots, said first cam slot engaging with said first cam follower; and
   a lens holder frame slidably mounted inside said cylindrical frame means, said lens holder frame having a second cam follower for engagement with said second cam slot and said guide slit, wherein said first cam follower provided on said cylindrical frame means is operatively associated with said first cam slot of the cam sleeve and said second cam follower provided on said lens holder frame is operatively associated with said second cam slot of said cam sleeve through said elongate guide slit.

9. A zoom lens mount assembly for an optical apparatus comprising:
   an optical system having an optical axis;
   a plurality of movable frames adapted to support said optical system;

said plurality of movable frames including a first movable frame, said first movable frame having an outer peripheral surface and a plurality of grooves formed in said outer surface;

a cam sleeve rotatable about said optical axis for moving said plurality of movable frames in operative association with rotation of said cam sleeve to achieve an optically variable magnification; and a plurality of key members engaging with said grooves, said key members movably supporting said cam sleeve and said movable frames.

10. A zoom lens mount assembly for an optical apparatus as recited in claim (9), wherein said first movable frame is slidably mounted within said cam sleeve and said plurality of movable frames further comprising a second movable frame slidably mounted within said first movable frame.

11. A zoom lens mount assembly for an optical apparatus as recited in claim (10), wherein each of said plurality of key members has an elongate plate-like member.

12. A zoom lens mount assembly for an optical apparatus as recited in claim (11), wherein each of said grooves engages with each elongate plate-like member to allow said first movable frame to linearly move in the direction of said optical axis in operative association with rotation of said cam sleeve.

13. A zoom lens mount assembly for an optical apparatus as recited in claim (12), wherein said first movable frame has a first cam follower and said cam sleeve has a first cam slot for camming engagement with said first cam follower.

14. A zoom lens mount assembly for an optical apparatus as recited in claim (12), wherein said second movable frame has a second cam follower and said cam sleeve has a second cam slot for camming engagement with said second cam follower and wherein said first movable sleeve has a guide slit adapted to engage with said second cam follower for linearly guiding said second movable frame in the direction of said optical axis.

15. A zoom lens mount assembly for an optical apparatus as recited in claim (11), wherein said plurality of key members include ring-shaped members for connecting said key members at opposite ends thereof.

16. A zoom lens mount assembly for an optical apparatus as recited in claim (12), wherein each of the key members includes arc-shaped flanges at opposite ends thereof wherein said respective key members are interconnected together at said flanges after said key members have been engaged with said respective grooves of said first movable frame.

17. A zoom lens mount assembly for an optical apparatus comprising:

an optical system having an optical axis;

a first generally cylindrical movable frame adapted to support said optical system, said first movable frame including a first cam follower provided on an outer peripheral surface of said first movable frame and defining therein an elongate guide slit linearly extending along the direction of the optical axis;

a second generally cylindrical movable frame adapted to support said optical system, said second movable frame being slidably received within an internal peripheral surface of said first movable frame and having a second cam follower provided on an outer peripheral surface thereof for engaging with said elongate guide slit of said first movable frame;

a cam sleeve slidably received about the outer peripheral surface of said first movable frame and rotatable about said optical axis for moving said first and second movable frames in operative association with rotation of said cam sleeve to achieve an optically variable magnification, said cam sleeve defining therein a first cam slot in camming engagement with said first cam follower and a second cam slot in camming engagement with said second cam follower; and a plurality of key members for movably supporting said cam sleeve and said first and second movable frames, said key members including interconnecting means at both ends thereof for interconnecting said key members, wherein said first movable frame includes a plurality of key grooves extending substantially in parallel with the optical axis and provided in the outer peripheral surface thereof and said plurality of key members slidably engage with said key grooves thereby allowing the first movable frame to substantially linearly move in the direction of the optical axis in operative association with rotation of said cam sleeve.

* * * * *